United States Patent Office 2,801,262
Patented July 30, 1957

2,801,262

PRODUCTION OF PHENOLS AND ALKANOATES THEREOF

David Ian Hutchinson Jacobs, Woodmansterne, and Bernard Hammond Markham Thompson, Beckenham, London, England, assignors, by mesne assignments, to Hercules Powder Company, a corporation of Delaware No Drawing. Application September 1, 1954,
Serial No. 453,686

Claims priority, application Great Britain
September 5, 1953

8 Claims. (Cl. 260—479)

The present invention relates to the production of phenols and in particular to the production of phenols having a meta- or para-carbinol substituent.

In U. S. copending application No. 416,964 dated March 17, 1954, now Patent No. 2,776,320 a process is described for the manufacture of hydroxy-hydroperoxide compounds by reacting with molecular oxygen in the liquid phase at elevated temperatures a mono-carbinol of the formula:

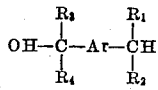

in which $R_1$ is hydrogen, an alkyl or an alicyclic radical, $R_2$, $R_3$ and $R_4$ are alkyl or alicyclic radicals and Ar represents an aromatic hydrocarbon nucleus, to which the substituent groups are attached at non-adjacent carbon atoms. The hydroxy-hydroperoxides, hereinafter called carbinol-hydroperoxides, produced in the above reaction have the formula:

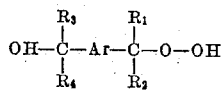

in which $R_1$, $R_2$, $R_3$, $R_4$ and Ar have the designation as noted above.

It has now been found that these carbinol-hydroperoxide compounds may be catalytically decomposed to give carbonol-phenols in good yields, thus forming a new and attractive route to these compounds, which could hitherto be made only by a Grignard reaction from, for instance, an alkyl meta-hydroxybenzoate.

Accordingly, the present invention comprises the process of decomposing a carbinol-hydroperoxide of the formula:

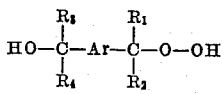

wherein $R_2$, $R_3$, and $R_4$ are alkyl or alicyclic radicals, $R_1$ is hydrogen, an alkyl or an alicyclic radical and Ar represents an aromatic hydrocarbon nucleus to which the substituent groups are attached at non-adjacent carbon atoms, under substantially anhydrous conditions by means of an acidic catalyst, to produce a carbinol-phenol of the formula:

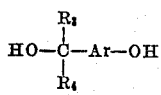

wherein $R_3$, $R_4$ and Ar have the designation noted above.

As illustrative of the carbinol-hydroperoxides which may be decomposed according to the process of the present invention compounds having as alkyl radicals, for instance, methyl, ethyl, propyl, isopropyl, butyl, isobutyl, secondary butyl groups and the like, as alicyclic radicals cyclopentyl, cyclohexyl groups and the like, and as the aromatic hydrocarbon nucleus benzene, naphthalene, anthracene, phenanthrene or their alkyl-substituted derivatives may be mentioned. If desired the groups $R_3$ and $R_4$ may be linked to form a single bivalent cycloalkyl group. The groups:

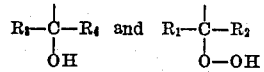

are attached to non-adjacent carbon atoms of the aromatic nucleus so that they are not ortho-oriented with respect to each other.

In carrying out the decomposition reaction of this invention the carbinol-hydroperoxide starting materials may be used in several different forms. Thus there may be used a crude oxidation reaction mixture such as that produced by the reaction in the liquid phase at elevated temperatures with molecular oxygen of a mono-carbinol of the formula:

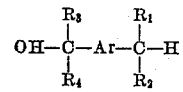

wherein $R_1$, $R_2$, $R_3$, $R_4$ and Ar have the designation as noted above, or of a mixture containing such a mono-carbinol. Such an oxidation reaction mixture may contain the carbinol-hydroperoxide in admixture with some of the original monocarbinol, and the mixture may also contain small amounts of secondary oxidation reaction products.

It is preferred, however, to utilise the carbinol-hydroperoxide in a more concentrated form and this may be achieved by subjecting the reaction mixture produced by the oxidation of a mono-carbinol as described above to fractional distillation at reduced pressure, or to extraction with, for instance, water, aqueous alcohol, or aqueous alkali solution. From the alkaline solution the free carbinol-hydroperoxides may be recovered by extraction of the alkaline solution with a suitable water-immiscible solvent for the carbinol-hydroperoxide or they may be liberated by neutralisation or acidification.

The starting material for the decomposition reaction according to the process of the present invention is suitably dissolved in a solvent such as for example acetone or methyl ethyl ketone, aromatic hydrocarbons or chlorinated aromatic hydrocarbons such as benzene, toluene, xylene, chlorobenzene, chloronaphthalene, diisopropyl ether, or substantially water insoluble ketones such as methyl isobutyl ketone, cyclohexanone or 2-hexanone, or mixtures of these compounds. Solvents which it is preferred to use are acetone, benzene, toluene, methyl isobutyl ketone and diisopropyl ether.

The catalysts which may be used in the decomposition reaction of the present invention are those catalysts which are known to catalyse the decomposition of an $\alpha,\alpha$-dialkyl-arylmethyl hydroperoxide to a phenol in a non-aqueous medium. The catalysts operable in the process of this invention belong to that class of catalysts known as acidic condensation catalysts. As examples of such catalysts may be mentioned inorganic acids such as hydrochloric acid, sulphuric acid and sulphur dioxide; acid activated or heat activated clays, such as montmorillonites, bentonites, fuller's earth, kaolinite, illite, attapulgite and the like; organic sulphonic acids such as benzene sulphonic acid, para-toluene sulphonic acid and sulphonated phenol-formaldehyde and sulphonated styrene-divinyl benzene polymers; phosphorus halides such as phosphorus pentachloride and phosphorus oxychloride; chloroacetic acids such as mono-, di- and tri-chloroacetic acids; and vermiculite. The catalysts which it is preferred to use are sulphuric acid and acid activated fuller's earths such as Fulmont 500 and F 237 marketed by the Fullers Earth Union Ltd., Redhill, Surrey.

The temperature which may be used during the decomposition reaction may be varied widely, depending mainly upon the activity of the catalyst. Some of the catalysts which are operable in accordance with the process of this invention are not very reactive at relatively low temperatures, for example 20° C. to 50° C., but give better results at higher temperatures, for example 100° C. The temperature at which the reaction is carried out will therefore depend mainly on the activity of the particular catalyst utilised. Generally speaking the decomposition may be effected at temperatures between 0° and 100° C. In a preferred embodiment the starting material is dissolved in acetone, and contacted with sulphuric acid, or with an acid-activated fuller's earth catalyst at a temperature in the range of about 40° to 100° C. and preferably about 80° C.

The reaction mixture should be in a substantially anhydrous condition since the presence of water retards and may completely stop the reaction. The water content of the reaction mixture should, therefore, not be substantially greater than about 1% and if more than that amount of water is formed by the decomposition of the carbinol-hydroperoxide it is desirable to arrange for the removal of such water during the course of the reaction. In a preferred embodiment in which the reaction is carried out in a batchwise manner with a clay catalyst, the reaction solvent and the catalyst are introduced into a vessel having a condenser and a means to remove water which may appear as a separate phase, and the mixture is stirred and refluxed until no more water separates. The carbinol-hydroperoxide is then introduced as rapidly as the vigour of the reaction permits, and the water formed in the course of the reaction is removed in the same way. In addition to effecting the removal of water in a satisfactory manner this method provides a convenient way of controlling the temperature of reaction when the cleavage solvent is suitably low-boiling.

The reaction may be carried out in a batchwise or in a continuous manner. In the former case the catalyst and the reaction solvent may be introduced into the reaction vessel first and the carbinol-hydroperoxide added gradually as noted above. When the reaction is carried out in a continuous manner one embodiment consists in supplying the catalyst in admixture with the reaction solvent counter-currently to the carbinol-hydroperoxide. Alternatively, a concurrent process may be used, the reaction solvent, catalyst and carbinol-hydroperoxide being fed at one end of the reactor and the reaction product being removed at the other end and treated for the recovery of the carbinol-phenol.

The carbinol-phenol may be recovered from the reaction mixture, for example, by neutralisation followed by distillation to strip off low-boiling solvents and the carbonyl compound produced in the decomposition, for example acetone, followed by recrystallisation from a suitable solvent such as benzene. Alternatively the reaction product after removal of low-boiling solvents may be subjected to azeotropic distillation under reduced pressure with a high-boiling substance which is substantially inert to the carbinol-phenol, the latter crystallising out on cooling the distillate. Suitable high-boiling substances which may be mentioned include methyl naphthalene, gas-oil, tri-isopropylbenzene, chloronaphthalene, bromonaphthalene, and mixtures of these liquids.

In a particular embodiment of the invention the carbinol-phenol resulting from the decomposition reaction is dehydrated to produce the corresponding alkenyl-phenol, i. e.

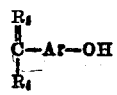

in which $R_5$ is the unsaturated radical corresponding to the original radical $R_3$. This may be achieved, for instance by refluxing the carbinol-phenol, either in the isolated form, or as the crude decomposition reaction mixture, in acetic anhydride or other acid anhydrides whereby the acetate of the alkenyl-phenol is formed, the acetate then being hydrolysed by methods known to the art. The dehydration may also be achieved by thermally treating the carbinol-phenol, for example by distillation in the absence of an entrainer at atmospheric or sub-atmospheric pressures.

In a further embodiment the conversion of the carbinol-hydroperoxide to the carbinol-phenol followed by dehydration to the alkenyl-phenol is effected in a single step by carrying out the decomposition reaction in the presence of acetic anhydride or other acid anhydrides whereby the acetate of the alkenyl-phenol is formed directly. This process may advantageously be carried out by contacting the carbinol-hydroperoxide dissolved in acetic anhydride (e. g. to a concentration of between about 10 and 50% weight/volume) with the decomposition reaction catalyst, suitably sulphuric acid or fuller's earth, at a temperature of less than about 100° C. until no peroxide can be detected in the reaction mixture. The catalyst may then be removed, for instance by neutralisation and/or filtration, the excess acetic anhydride and acetic acid distilled off and the residue fractionated to recover the alkenyl-phenyl acetate.

The following examples are given further to illustrate the process of the invention. In the examples the parts by weight and parts by volume bear the same relationship to each other as do kilograms to litres.

*Example 1*

A solution of pure m-(2-hydroxy-2-propyl)-α,α-dimethylbenzyl hydroperoxide (10.5 parts by weight) in dry benzene (50 parts by volume) was added from a tap-funnel during one minute to a gently refluxing solution of sulphuric acid (0.15 part by weight) in dry acetone (100 parts by volume). Reflux increased during the addition owing to the heat of reaction and after a total of 5 minutes from the commencement of the addition of the benzene solution the reaction mixture was sampled and tested for peroxide. As cleavage appeared to be complete the reaction mixture was neutralised by adding finely divided magnesium oxide (1 part by weight) and the product filtered after standing for a few minutes.

The clear, very pale yellow solution was evaporated at room temperature under reduced pressure. A yellow oily residue remained which consistently refused to crystallise. After the addition of a little benzene and warming to complete solution, colourless crystals were deposited upon cooling. After two further recrystallisations from benzene the product, m-(2-hydroxy-2-propyl)-phenol (2.2 parts by weight) was obtained as a white crystalline solid M. P. 104–5° C. The yield was 30% based upon m-(2-hydroxy-2-propyl)-α,α-dimethylbenzyl hydroperoxide.

*Example 2* m-(2-hydroxy-2-propyl) - α,α - dimethylbenzyl hydroperoxide (14.5 parts by weight) was dissolved in dry acetone (50 parts by volume) and the solution run into a refluxing, stirred suspension of an acid-treated fuller's earth marketed by the Fullers Earth Union Ltd. (F. E. 237; 0.5 part by weight) in dry acetone (90 parts by volume) over a period of two minutes. Stirring under reflux was continued for 20 minutes, by which time all the peroxide had decomposed. After filtering off the catalyst, the acetone was stripped off on the water-pump. On removing the last traces of acetone at a pressure of 0.1 mm. Hg, the residue crystallised. On recrystallisation from benzene, 7.65 parts by weight of m-(2-hydroxy-2-propyl)-phenol representing a yield of 73% was obtained having a melting point of 105–6° C.

Example 3

25 parts by weight of meta-(2-hydroxy-2-propyl)-α,α-dimethylbenzyl hydroperoxide, dissolved in acetic anhydride (100 parts by volume), were run into a stirred solution of sulphuric acid in acetic anhydride (0.1% weight/volume, 250 parts by volume), heated to 60° C. in a water-bath, over a period of 5 minutes. The temperature rose to 80° C. Five minutes after the addition of the peroxide was completed, no trace of peroxide could be detected in the reaction mixture. The catalyst was therefore neutralised by the addition of anhydrous sodium acetate (0.5 part by weight), and the product then refluxed for two hours. At the end of that time the excess acetic anhydride and acetic acid were distilled off under reduced pressure, the residue filtered to remove sodium sulphate, and then fractionated at 10 mm. An approximately 50% yield of m-isopropenylphenyl acetate was obtained as a liquid, B. P. 123°/10 mm. $n_D^{20}$ 1.5300.

Example 4

Example 3 was repeated, using fuller's earth grade 237 (2.5 parts by weight) as catalyst in place of the sulphuric acid. In this case, the time needed to decompose all the peroxide was 24 hours. After filtering off the catalyst, the acetic anhydride and acetic acid were removed as before, but in this case the residue was flash-distilled before fractionation. A yield of approximately 60% of the theoretical of m-isopropenylphenyl acetate was obtained, with the same properties as before.

Example 5

A solution of pure meta-(2-hydroxy-2-butyl)α-methyl, α-ethylbenzyl hydroperoxide (15 parts by volume) in dry benzene (60 parts by volume) was added from a tap-funnel over about two minutes to a gently refluxing solution of p-toluene sulphonic acid (1 part by weight) in dry acetone (100 parts by volume). Refluxing was continued, with stirring, for about 15 minutes, after which the reaction mixture was sampled and tested for peroxide. When the decomposition was complete the reaction mixture was neutralised with finely divided magnesium oxide and the product filtered after standing for a few minutes. The solution was then evaporated under reduced pressure, at room temperature, and the residue crystallised from benzene to produce crystals of meta-(2-hydroxy-2-butyl)phenol.

The process of Example 5 was repeated using (a) a solution of benzene-sulphonic acid in dry benzene and (b) a solution of trichloracetic acid in dry benzene as the decomposition catalyst. Essentially the same results were obtained in both cases.

We claim:

1. The process which comprises decomposing a carbinol hydroperoxide of the formula

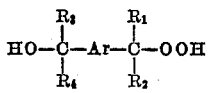

wherein $R_1$ is a member of the group consisting of hydrogen, lower alkyl, and cyclo lower alkyl, and $R_2$, $R_3$ and $R_4$ are members of the group consisting of lower alkyl and cyclo lower alkyl, and Ar is a benzene hydrocarbon nucleus in which the points of attachment to the benzene nucleus are selected from the group consisting of meta and para, with an acidic condensation catalyst under substantially anhydrous conditions in the presence of an anhydride of a lower alkanoic acid at a temperature in the range of 0° C. to 100° C. and recovering an ester of said lower alkanoic acid and a decomposition product of the formula

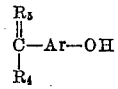

in which $R_4$ and Ar are as above defined and $R_5$ is a divalent radical selected from the group consisting of alkylidene and cycloalkylidene corresponding to said above-defined $R_3$ in configuration and chain length.

2. The process of claim 1 in which the anhydride is acetic anhydride and the ester is the acetate.

3. The process of claim 1 in which the decomposition temperature is selected from the range of 40–100° C.

4. The process of claim 1 in which the anhydride is acetic anhydride and the decomposition temperature is selected from the range of 40–100° C.

5. The process of claim 1 in which the catalyst is sulfuric acid.

6. The process of claim 1 in which the catalyst is sulfur dioxide.

7. The process of claim 1 in which the catalyst is an acid activated clay.

8. The process which comprises decomposing a carbinol hydroperoxide of the formula

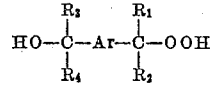

wherein $R_1$ is a member of the group consisting of hydrogen, lower alkyl, and cyclo lower alkyl, and $R_2$, $R_3$ and $R_4$ are members of the group consisting of lower alkyl and cyclo lower alkyl, and Ar is a benzene hydrocarbon nucleus in which the points of attachment to the benzene nucleus are meta, with an acidic condensation catalyst under substantially anhydrous conditions in the presence of an anhydride of a lower alkanoic acid at a temperature in the range of 0° C. to 100° C. and recovering an ester of said lower alkanoic acid and a decomposition product of the formula

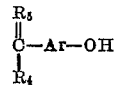

in which $R_4$ and Ar are as above defined and $R_5$ is a divalent radical selected from the group consisting of alkylidene and cycloalkylidene corresponding to said above-defined $R_3$ in configuration and chain length.

References Cited in the file of this patent

UNITED STATES PATENTS

| | | |
|---|---|---|
| 1,865,544 | Schoeller et al. | July 5, 1932 |
| 2,276,138 | Alderman et al. | Mar. 10, 1942 |
| 2,548,435 | Lorand et al. | Apr. 10, 1951 |

OTHER REFERENCES

Kharasch et al.: Jour. Organic Chem. 151 (1950), pp. 748–52.